(12) United States Patent
Farris et al.

(10) Patent No.: US 6,721,306 B1
(45) Date of Patent: Apr. 13, 2004

(54) PUBLIC WIRELESS/CORDLESS INTERNET GATEWAY

(75) Inventors: Robert D. Farris, Sterling, VA (US); Eric A. Voit, Baltimore, MD (US); James E. Curry, Herndon, VA (US)

(73) Assignee: Verizon Services Corp., Arlington, VA (US)

( * ) Notice: Subject to any disclaimer, the term of this patent is extended or adjusted under 35 U.S.C. 154(b) by 0 days.

(21) Appl. No.: 08/815,075

(22) Filed: Mar. 11, 1997

Related U.S. Application Data (63) Continuation-in-part of application No. 08/815,291, filed on Mar. 11, 1997, now Pat. No. 6,542,497.

(51) Int. Cl.[7] .......................... H04L 12/66; H04L 12/28
(52) U.S. Cl. ...................... 370/352; 370/401; 370/338
(58) Field of Search ............................... 370/351, 352, 370/353, 354, 356, 400, 401, 389, 392, 463, 465, 357, 358, 339; 379/88.13, 88.17, 93.05, 93.06, 93.07, 93.08

(56) References Cited

U.S. PATENT DOCUMENTS

| | | |
|---|---|---|
| 4,672,658 A | 6/1987 | Kavehrad et al. |
| 4,768,219 A | 8/1988 | Yamagata et al. |
| 4,852,148 A | 7/1989 | Shibata et al. |
| 4,875,231 A | 10/1989 | Hara et al. |
| 4,878,238 A | 10/1989 | Rash et al. |
| 4,965,849 A | 10/1990 | Kunihiro |
| 4,969,205 A | 11/1990 | Itoh |
| 4,980,907 A | 12/1990 | Raith et al. |
| 4,989,230 A | 1/1991 | Gillig et al. |
| 5,014,295 A | 5/1991 | Kunihiro |
| 5,020,094 A | 5/1991 | Rash |
| 5,040,177 A | 8/1991 | Martin et al. |
| 5,044,010 A | 8/1991 | Frenkiel |
| 5,127,042 A | 6/1992 | Gillig et al. |
| 5,155,689 A | 10/1992 | Wortham |
| 5,157,709 A | 10/1992 | Ohteru |
| 5,157,710 A | 10/1992 | Itoh |
| 5,159,592 A | * 10/1992 | Perkins |
| 5,181,200 A | 1/1993 | Harrison |
| 5,410,543 A | 4/1995 | Seitz et al. |

(List continued on next page.)

OTHER PUBLICATIONS

"The Building of Intelligent Networks: Architecture and systems for Alcatel", Dunogue et al., Alcatel CIT commutation & transmission No. 2, SOTELEC, 1989, pp. 5–22.

"Freebie Heebie–Jeebies: New Long–Distance Calling Via the Internet Scares Small Phone Firms", Mills, Mike, The Washington Post, Mar. 8, 1996, pp. F1.

(List continued on next page.)

Primary Examiner—Kenneth Vanderpuye
(74) Attorney, Agent, or Firm—Leonard C. Suchyta, Esq.; Glenn R. Forbis, Esq.

(57) ABSTRACT

A localized wireless gateway system provides wireless telephone communication and provides access to a public packet data network, such as the Internet, for at least voice telephone type communications. The wireless gateway system includes a number of base stations, essentially built around computers with digital transceiver circuitry, which provide an air interface to a number of digital terminal devices. The terminal devices communicate audio information in a standard digitized and compressed data format. The base stations provide two-way communications of the audio data over a public packet switched data network, either directly or via a local area network and a server coupled to the public data network. A server and local area network provide local voice and data communications as well as voice and data communication access to the public packet data network.

27 Claims, 3 Drawing Sheets

U.S. PATENT DOCUMENTS

| | | | | |
|---|---|---|---|---|
| 5,442,633 | A | | 8/1995 | Perkins et al. |
| 5,475,689 | A | * | 12/1995 | Kay et al. |
| 5,519,706 | A | * | 5/1996 | Bantz et al. |
| 5,608,786 | A | | 3/1997 | Gordon |
| 5,724,355 | A | | 3/1998 | Bruno et al. |
| 5,726,984 | A | | 3/1998 | Kubler et al. |
| 5,748,620 | A | * | 5/1998 | Capurka ..................... 370/328 |
| 5,793,762 | A | * | 8/1998 | Penners et al. |
| 5,822,309 | A | * | 10/1998 | Ayanoglu ................... 370/315 |
| 5,845,068 | A | * | 12/1998 | Winiger |
| 5,848,098 | A | * | 12/1998 | Cheng et al. ............... 375/220 |
| 5,850,444 | A | * | 12/1998 | Rune ........................... 380/21 |
| 5,889,816 | A | * | 3/1999 | Agrawal ..................... 375/220 |
| 5,901,142 | A | * | 5/1999 | Averbuch et al. ........... 370/329 |
| 5,905,719 | A | * | 5/1999 | Arnold et al. ............... 370/330 |
| 5,910,946 | A | * | 6/1999 | Csapo ......................... 370/328 |
| 5,943,399 | A | * | 8/1999 | Bannister et al. ........ 379/88.17 |
| 5,949,775 | A | * | 9/1999 | Rautiola et al. ............ 370/338 |
| 5,953,676 | A | * | 9/1999 | Berry et al. ................ 455/564 |
| 5,960,170 | A | * | 9/1999 | Chen et al. |
| 5,987,327 | A | * | 11/1999 | Lev et al. ................... 455/445 |
| 6,006,090 | A | * | 12/1999 | Coleman et al. |
| 6,038,595 | A | * | 3/2000 | Ortony |
| 6,055,427 | A | * | 4/2000 | Ojaniemi .................... 455/436 |
| 6,570,871 | B1 | * | 5/2003 | Schneider .................. 370/356 |

OTHER PUBLICATIONS

"Internet phone wars heating up: Companies improve and encourage users to test products", Hughes, David T., The Journal, Fairfax, Virginia, Jan. 2, 1996, pp. A6.

"What hath (net) god wrought", Hughes, David T., The Journal, Fairfax, Virginia, Feb. 21, 1995, pp. B1 and B2.

"WebPhone heading for serious telephony", Hughes, David T., The Journal, Fairfax, Virginia, May 28, 1996, pp. A8.

"It's the Net's Best Thing to Being There: With Right Software, Computer Becomes a Toll–Free Telephone", Mills, Mike, The Washington Post, Jan. 23, 1996, pp. C1 and C5.

"Computer Telephony Over the Internet", Grigonis, Richard, CT and the Net, Mar. 1996.

"Geek of the Week", Karn, Phil et al., Internet Talk Radio, Mobil IP Networking, Nov. 1993.

"How to Build an Internet PBX", McConnell, Brian, http://www.phonezone.com/ip–phone.htm, pp. 1–9.

"Welcome to the Phone Zone", Pacific Telephony Design, http://www.phonezone.com/index2.htm, pp. 1–6.

"Computer Telephony and the Internet", Stylus Innovation, http://www.stylus.com/hvml.htm, pp. 1–9.

"Innovations in Internet Telephony: The Internet as the Competitor to the POTS Network", Sears, Andrew, Innovations in Internet Telephony: The Internet as the Successor to the POTS Network, Feb. 28, 1996, pp. 1–6.

* cited by examiner

PUBLIC WIRELESS/CORDLESS INTERNET GATEWAY

CROSS-REFERENCE TO RELATED APPLICATION

This application is a continuation in part of U.S. patent application Ser. No. 08/815,291 filed Mar. 11, 1997 entitled "PUBLIC WIRELESS/CORDLESS INTERNET GATEWAY" now U.S. Pat. No. 6,542,497, the disclosure of which is incorporated entirely herein by reference.

TECHNICAL FIELD

The present invention relates to a localized installation of a gateway system, for private or limited public wireless telephone communication, with all telephone calls going into and coming out of the localized wireless gateway system utilizing a public packet switched data network such as the Internet.

Acronyms

The written description uses a large number of acronyms to refer to various services and system components. Although generally known, use of several of these acronyms is not strictly standardized in the art. For purposes of this discussion, acronyms therefore will be defined as follows:

ADPCM—Adaptive Differential Pulse Code Modulation
ARPA—Advanced Research Projects Agency
ARPANET—Advanced Research Projects Agency NETwork
AS—Autonomous Systems
ATM—Asynchronous Transfer Mode
CDMA—Code Division Multiple Access
CELP—Code Excited Linear Predictive coding
CO—Central Office
CODEC—digital CODer and DECoder
CREN—Corporation for Research and Educational Networking
CPU—Central Processing Unit
CT-2—Cordless Telephone two
DECT—Digital European Cordless Telecommunication System
DHCP—Dynamic Host Configuration Protocol
DNS—Domain Name Server
DTMF—Dual Tone Multi-Frequency
FDDI—Fiber Distributed Data Interface
FM—Frequency Modulation
GAO—Government Accounting Office
GSM—Global System for Mobile
HLR—Home Location Register
IP—Internet Protocol
ISDN—Integrated Services Digital Network
ISP—Internet Service Provider
LAN—Local Area Network
MAC—Media Access Control
MILNET—MILitary NETwork
NSFNET—National Science Foundation NETwork
PC—Personal Computer
PCS—Personal Communications Service
PABX—Private Automatic Branch Exchange
PBX—Private Branch Exchange
PPP—Point to Point Protocol
PRI—Primary Rate Interface (for ISDN)
PSTN—Public Switched Telephone Network
RAM—Random Access Memory
RF—Radio Frequency
ROM—Read Only Memory
TCP—Transmission Control Protocol
SONET—Synchronous Optical NETwork
SMDS—Switched Megabit Data Service
SMDI—Simplified Message Desk Interface
TDMA—Time Division Multiple Access
VLR—Visitor Location Register
VSELP—Vector-Sum Excited Linear Predictive coding

BACKGROUND ART

In our increasingly mobile society, there has been an ever increasing demand for mobile communications to allow a person to roam freely while making and receiving telephone calls from virtually any location. A wide range of wireless systems are in use today and more are now scheduled for near term future deployment, including cellular telephone systems (both analog and digital) and lower power portable handset type systems now commonly referred to as personal communications service (PCS) systems.

Public cellular telephone systems and the emerging low-power, digital cellular PCS systems provide a high degree of mobile communications, as subscribers roam over large geographic areas. However, such systems are expensive to deploy, and as a result, air time charges for use of such systems are high. A number of applications have been recognized where wireless communications are desirable, but implementation of a full public cellular telephone system is unnecessary. This specification refers to these more limited systems as 'localized' wireless or cordless telephone type communications systems.

For example, U.S. Pat. No. 4,980,907 to Raith et al. discloses a wireless communication system with roaming capabilities. Each portable radio terminal can operate at a subscriber's residence as part of residential equipment, or in a commercial subscriber's business area as an extension to a private automatic branch exchange (PABX). When away from the normal residential or business location, however, the portable radio terminal can operate through public transceivers referred to as telepoint terminals. Each residential installation, PABX and telephone terminal connects through a telephone line or trunk to an exchange of a public switched telecommunication network (PSTN).

U.S. Pat. No. 4,875,231 to Hara et al. discloses a radio telephone system, which includes a base station connected to a telephone exchange and a plurality of mobile stations. The mobile stations communicate with the base station through a control channel and a number of communication channels.

Each of U.S. Pat. Nos. 4,965,849 and 5,014,295 to Kunihiro discloses a cordless telephone system, wherein the master station connects to two outgoing telephone lines. The master station includes a number of base transceiver units for simultaneously communicating with a number of portable wireless handsets.

U.S. Pat. Nos. 4,878,238 and 5,020,094 to Rash et al. describe a cordless telephone network which allows each hand-held cordless telephone unit to be used with any of a number of strategically located base units, for example located at truck stops, rest areas along interstate highways, convention centers and the like. A base unit connects via a telephone line to a conventional commercial telephone network. The base unit includes an FM transmitter, FM receiver, CPU and a telephone line interface circuit. The Rash et al. Patents mention that it would be possible to have multiple base units at one location, each one being attached to a different land line and each one operating on a cordless telephone channel.

As shown by the above description, the localized cordless telephone systems utilized in the prior art have all relied on an existing public telephone network to transport communications outside of the cordless telephone systems themselves. In such a situation, for example, a long distance call typically would go through a local exchange carrier to the point of presence of an interexchange carrier for routing to the area of the called party. Although fees and billing arrangements vary widely, each carrier imposes some form of charge for its handling of a portion of such a call. The long distance and international charges by the interexchange carriers, in particular, can be quite high.

Concurrent with developments in wireless communications, outlined above, attention recently has been directed to implementing a variety of communication services, including voice telephone service, over the worldwide packet switched data network now commonly known as the Internet. The Internet had its genesis in U.S. Government programs funded by the Advanced Research Projects Agency (ARPA). That research made possible national internetworked data communication systems. This work resulted in the development of network standards as well as a set of conventions, known as protocols, for interconnecting data networks and routing information across the networks. These protocols are commonly referred to as TCP/IP (transmission control protocol/internet protocol). The TCP/IP protocols were originally developed for use only through ARPANET but have subsequently become widely used in the industry. TCP/IP is flexible and robust. TCP takes care of the integrity, and IP moves the data.

The Internet provides two broad types of services: connectionless packet delivery service and reliable stream transport service. The Internet basically comprises several large computer networks joined together over high-speed data links ranging from ISDN to T1, T3, FDDI, SONET, SMDS, ATM, OT1, etc. The most prominent of these national nets are MILNET (Military Network), NSFNET (National Science Foundation NETwork), and CREN (Corporation for Research and Educational Networking) In 1995, the Government Accounting Office (GAO) reported that the Internet linked 59,000 networks, 2.2 million computers and 15 million users in 92 countries. However, since then it is estimated that the number of Internet users continues to double approximately annually.

In simplified fashion the Internet may be viewed as a series of packet data switches or 'routers' connected together with computers connected to the routers. The information providers constitute the end systems which collect and market the information through their own servers. Access providers are companies such as UUNET, PSI, MCI and SPRINT which transport the information. Such companies market the usage of their networks to the actual end users.

Figure 3:
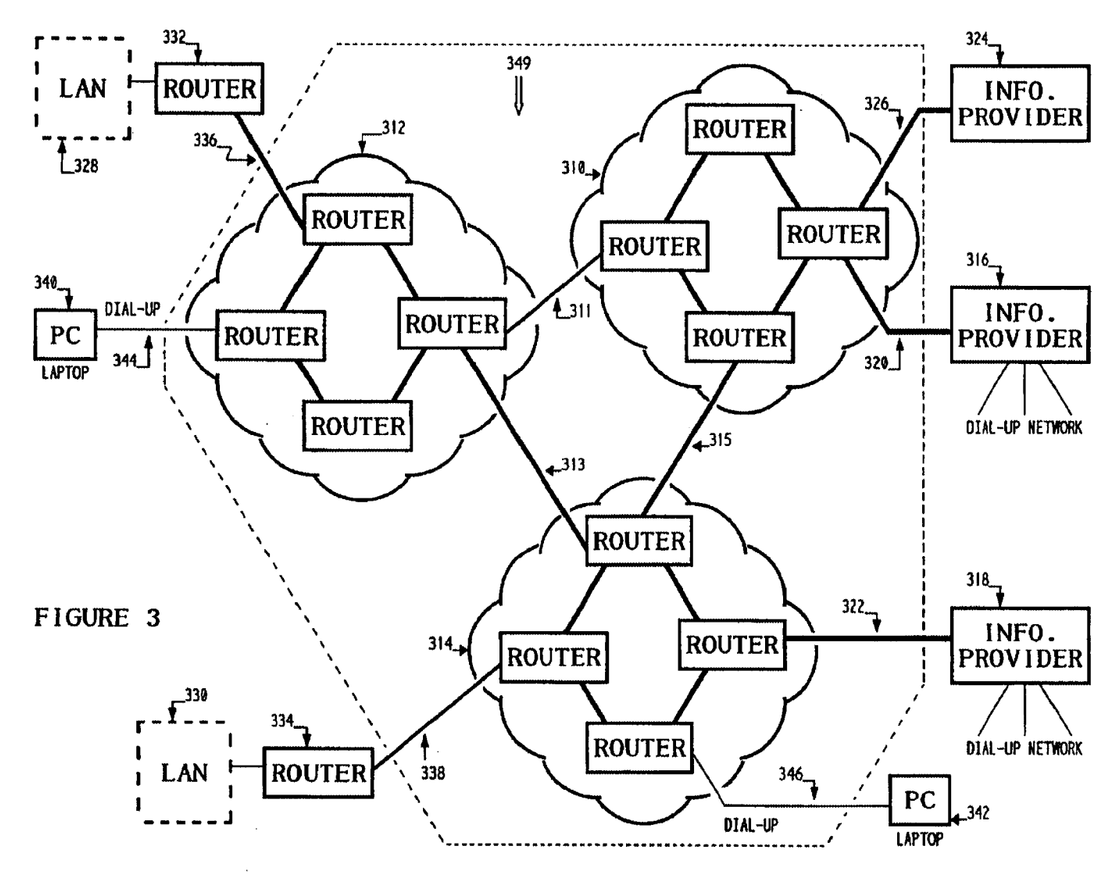
FIG. 3 is a block diagram of the public packet switched data network now commonly known as the Internet.

FIG. 3 shows a simplified diagram of the Internet 349 and various types of systems typically connected thereto. Generally speaking the Internet consists of Autonomous Systems (AS) type packet data networks which may be owned and operated by Internet Service Providers (ISPs) such as PSI, UUNET, MCI, SPRINT, etc. Three such AS/ISP networks appear in FIG. 3 at 310, 312 and 314. The Autonomous Systems (ASs) are linked by high bandwidth Inter-AS Connections 311, 313 and 315. Information providers 316 and 318, such as America Online (AOL) and Compuserve, connect to the Internet via high speed lines 320 and 322, such as T1/T3 and the like. Information providers generally do not have their own Internet based Autonomous Systems but have or use Dial-Up Networks such as SprintNet (X.25), DATAPAC and TYMNET.

In some cases, the information provider 316 or 318 operates a host server or network of servers that their customers access by dial-up connection. If a customer wants information over and above that offered by the provider, the host server provides a tunnel connection through to the high speed link and the Internet 349. Other parties may connect into the network 349 at some other point and access information offered by provider 316 or 318 through the network 349.

By way of current illustration, MCI is both an ISP and an information provider, SPRINT is an ISP, and the MicroSoft Network is an information provider using UUNET as its ISP. Other information providers, such as universities, are indicated in exemplary fashion at 324 and are connected to the AS/ISPs via the same type connections here illustrated as T1 lines 326. Parties access information on servers of providers 324 via the Internet 349. Corporate Local Area Networks (LANs), such as those illustrated in 328 and 330, are connected through routers 332 and 334 and high speed data links such as T1 lines 336 and 338. Laptop computers 340 and 342 are representative of various personal computers and the like connected to the Internet via the public switched telephone network (PSTN) and are shown connected to the AS/ISPs via dial up links 344 and 346.

Recently, several companies have developed software for use on personal computers to permit two-way transfer of real-time voice information via an Internet data link between two personal computers, for example between PCs 340 and 342. In one of the directions, the sending computer converts voice signals from analog to digital format. The software facilitates data compression down to a rate compatible with modem communication via a POTS telephone line, in some cases as low as 2.4 kbits/s. The software also facilitates encapsulation of the digitized and compressed voice data into the TCP/IP protocol, with appropriate addressing to permit communication via the Internet 349. At the receiving end, the computer and software reverse the process to recover the analog voice information for presentation to the other party. These programs permit telephone-like communication between Internet users.

PCs having voice communication capabilities can conduct two-way, real-time audio communications with each other, in a manner directly analogous to a two-way telephone conversation. However, the actual signals exchanged between two such terminal devices go through the public packet data network. Typically, such communications at least bypass long distance interexchange carriers.

Internet based telephone programs have relied on servers (not separately shown) coupled to the Internet to establish voice communication links through the networks. Each person active on the network, who is willing to accept a voice call, must register with a server. A calling party can call only those persons registered on the voice communication server.

The development of the Internet, particularly voice telephone communication over the Internet, has been separate from efforts to develop and deploy localized wireless or cordless telephone type communications systems. For example, the PCs and server systems on the market today apparently have not permitted calling through the Internet to wireless telephone subscribers, particularly when roaming. As a result, a need still exists to find an effective cheaper alternative to the transport of calls to and from localized wireless systems via telephone carrier networks. More specifically, a need exists to provide a localized wireless or cordless telephone type communications system which can at least selectively provide voice traffic transport over a public packet switched data network, such as the Internet. A need further exists for systems and call processing methodologies to facilitate easy calling and efficient routing of calls to and from such a system, via the public packet data network.

DISCLOSURE OF THE INVENTION

The present invention meets the above stated needs by providing a localized wireless gateway offering cordless telephone service, including voice communication service, via a public packet network such as the Internet.

Thus, in one aspect, the present invention relates to a localized wireless gateway system. The inventive gateway system includes a plurality of base station transceivers. These transceivers provide two-way wireless voice frequency communication signals, in a standard compressed digital data format, to and from wireless telephone terminals within a local area. Each of the base station transceivers is built around a client computer, typically a client PC. The gateway system includes a local area data network coupled to the client computers, and a server computer interfaced to the local area data network. The server computer includes an interface to the public packet data network. The server computer processes the standard compressed digital data format signals for two-way packet communication via the public packet data network. The server computer also performs necessary signaling through the public packet data network to establish two-way voice communication sessions through the public packet data network.

In the preferred implementation, the base station transceivers each include a digital modulator, a digital demodulator, and an interface coupling the client computer to the local area data network. The wireless telephone terminals utilize a wireless telephone communication protocol for digitized and compressed voice communication, preferably code excited linear predictive (CELP) coding or vector-sum excited linear predictive (VSELP) coding. The base station transceivers and the server pass audio communication signals in this format to and receive similar signals from the public packet data network. If the public packet data network utilizes Internet Protocol (IP) packets, for example, the server may perform two-way IP packet processing and exchange signals with the base station in sequential order in the protocol utilized on the local area network, such as Ethernet or Asynchronous Transfer Mode (ATM).

The preferred implementation utilizing a local area network offers other types of communications. Data devices coupled to the local area network can exchange data messages and/or access the public packet data network via the server. Any such data devices having voice communication capabilities also can conduct various telephone-type communications, between two or more such devices, to and from wireless telephone terminal devices and to and from devices accessed via the server and the public packet data network.

Alternative implementations may utilize a direct connection of the public packet data network to one or more of the base station transceivers. In such a case, the data links to and from the transceivers would utilize IP packets.

Thus, in another aspect, the present invention contemplates a base station transceiver facilitating communication of cordless or wireless telephone signals over a public packet data network. The transceiver includes a central processing unit as well as a digital modulator and a digital demodulator. The central processing unit controls the modulator and demodulator to provide wireless communication of digitized and compressed audio signals for a plurality of wireless terminal devices over a predetermined air interface. The base station transceiver also includes a network interface to a data network carrying data packets in a predefined packet data protocol. The data network may be a local area network (LAN) coupled to the public packet data network, or the data network may itself be the public packet data network. A wireless gateway system may comprise one or more of these base station transceivers.

In each implementation, the wireless gateway system eliminates the need for switched telephone communication except for those cases where the distant party is accessible only via a public switched telephone connection. The public packet data network will include a PSTN gateway for establishing communications with such parties, and the link from the wireless terminal device to that gateway will still utilize the public packet switched data network.

The preferred implementation provides local data communications over the LAN as well as voice communication features analogous to those offered by a private branch exchange, in a single integrated communication system. That implementation also offers data access to the public packet switched data network, e.g. the Internet. The preferred implementation further offers telephone type calling capabilities, without calls to and from the system going through either a local telephone carrier or an interexchange carrier coupled directly to the particular wireless gateway system.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

BEST MODE FOR CARRYING OUT THE INVENTION

Figure 1:
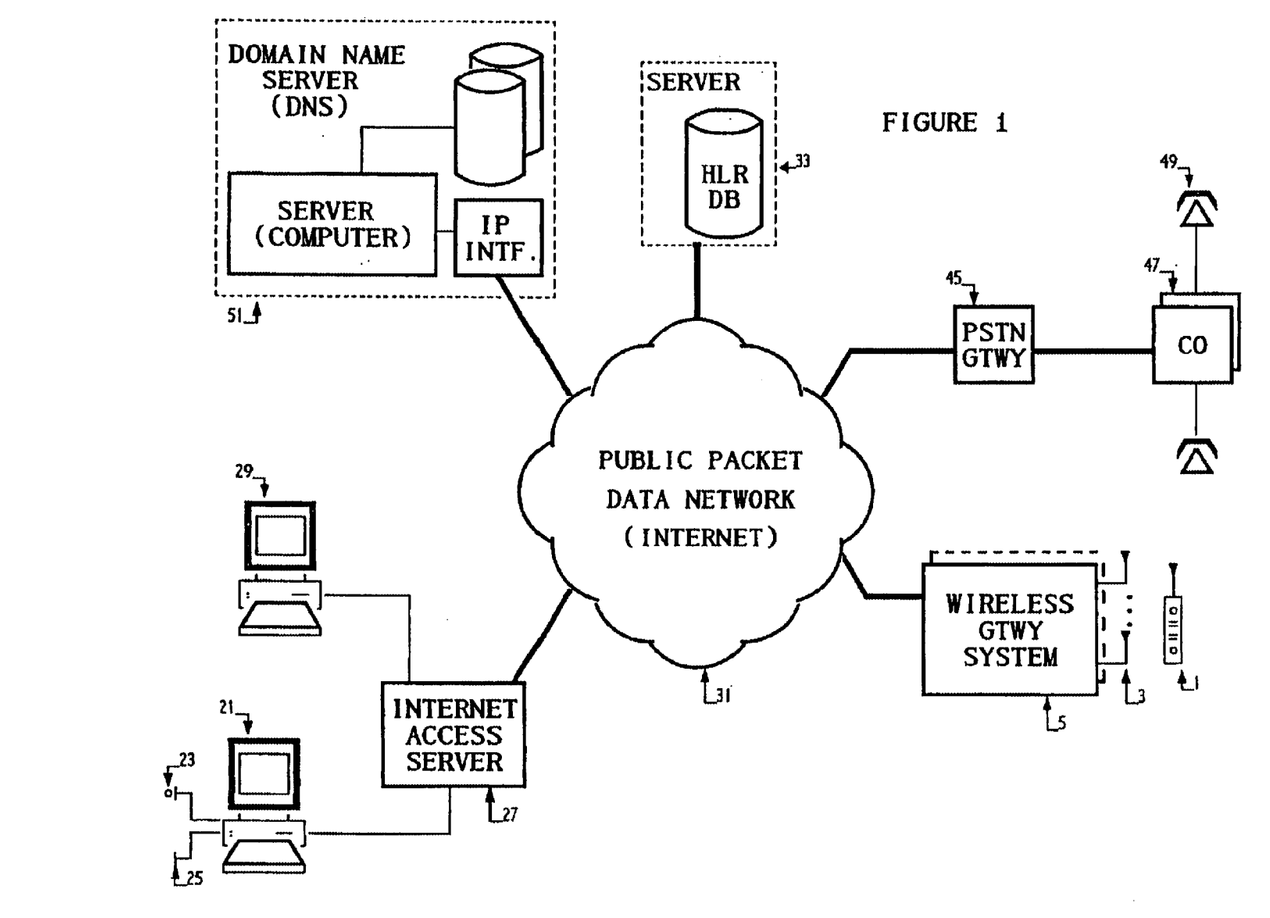
FIG. 1 is a high level block diagram showing the relationship of a wireless gateway system in accord with the invention to other communication network elements.

With reference to FIG. 1, the present invention provides a localized wireless gateway system 5 enabling wireless communication through antennas 3 with cordless or wireless telephone terminals shown as handsets 1. As used herein, 'voice' communication is essentially synonymous with 'audio' communication. The wireless handsets provide two-way communications to the wireless gateway system 5 of audio frequency information signals, typically voice signals. The wireless gateway system at least provides two-way voice communication from a wireless handset 1 via a public packet data network 31. The communication via the network 31 may go to voice telephone capable terminal devices, such as personal computers (PCs) 21, or through an appropriate PSTN gateway 45 to telephones 49 coupled to central offices 47 of a public switched telephone network, either for local or long distance calls to standard wireline telephones.

The gateway system 5 is a localized private system, as opposed to the common, public cellular telephone networks. The gateway system, for example, may provide communication within an office or industrial complex. Alternatively, a service provider may operate the gateway system 5 in a geographically limited public area of interest, such as an airport, shopping center, hotel/convention center complex or the like.

Each user will have a wireless telephone terminal device, preferably a wireless telephone handset 1. The wireless handset 1 is similar to a portable cellular telephone but operates at lower power levels and generally will be less expensive to own and operate. Because of its low power operation, the portable handset 1 has a longer period of operation between recharging of the battery, but the working range of the portable handset from an antenna site is relatively short.

Digital implementations of the handsets are preferred. The preferred embodiments utilize a digital wireless or cordless handset, similar to those used in common digital GSM (Global System for Mobile), TDMA (Time Division Multiple Access), or CDMA (Code Division Multiple Access) type cellular systems or in public cordless telephone systems such as CT-2 (Cordless Telephone two) or DECT (Digital European Cordless Telecommunication System).

In a typical implementation, the digital handset 1 will include a digital modulator and a digital demodulator coupled to an antenna. The handset also includes a digital coder and decoder (CODEC) coupled through appropriate analog circuitry to a microphone and a speaker. The CODEC digitizes and compresses audio input signals from the microphone and supplies the encoded signals to the digital modulator. The digital modulator modulates the message into a channel (e.g. frequency and TDMA or CDMA slot) temporarily assigned to the handset and broadcasts the modulated message from the associated antenna. In the opposite direction, the handset receives a broadcast message from the assigned channel via the antenna, and the digital demodulator demodulates the message. If the message represents encoded audio information, the demodulator supplies the data to the CODEC. The CODEC in turn decompresses the data and converts the data to an analog signal. The CODEC supplies the analog signal through appropriate driver circuitry to the speaker, for audible output to the user.

The digital handset also typically includes a microprocessor with associated random access and read only memory (RAM and ROM), for controlling operations of the handset. The handset includes a display and display driver circuitry coupled to the microprocessor, for displaying a wide range of useful information to the user, such as digits entered for dialing, calling party numbers, etc. The handset also includes a keypad to permit the user to input certain information, such as destination digits.

The microprocessor sends and receives a variety of signaling messages over the air interface during call processing and to effectuate network dictated control of the handset components. For transmission, the microprocessor supplies message to the modulator which modulates the data message and transmits it from the antenna, over the air to a base station. The antenna picks up signaling messages broadcast by the base station. The demodulator demodulates the signaling messages and supplies the signaling message data to the microprocessor for display or for use in controlling operation of the handset components.

In accord with the present invention, the wireless gateway system 5 provides communications between the handsets 1, communication between handsets 1 and any local communication devices hardwired to the wireless gateway system 5, and communication between handsets 1 and various terminal devices which are accessed in whole or in part through the public packet switched data network 31. As discussed in more detail with regard to FIG. 2, the preferred implementation of the wireless gateway system 5 includes one or more base stations, a server coupled to the public packet switched data network 31 and a digital local area network coupled to the base stations and the server.

All communications to and from the handsets 1 utilize a digital compression standard already common in the wireless telephone industry, both for local communications and for communications to remote terminal devices via the public packet data network 31. Also, the communications with distant devices all pass through the public packet data network 31, bypassing both a local exchange carrier and any interexchange carrier for dialup like connections.

FIG. 1 depicts the public packet data network 31 as a cloud. In the preferred embodiment, the public packet data network 31 is a wide area data network formed of a number of interlinked networks, such as the international network now commonly referred to as the 'Internet' More specifically, the network 31 comprises a network 349 of interconnected routers and networks, such as shown in FIG. 3 and discussed above. The network 31 utilizes Internet Protocol (IP) based packet switching to route data packets between source and destination nodes coupled to the network. As discussed above, a variety of computers and servers (not shown in FIG. 1 for simplicity) connect to the network 31, for example for providing web site services. Terminal devices communicate with the computers and servers as well as with each other. For simplicity, FIG. 1 shows two personal computer (PC) type terminal devices 21 and 29.

Typically, each of the PCs connect to the network 31 through an Internet access server, such as server 27 shown in FIG. 1. The server 27 aggregates traffic to and from the associated terminal devices for transport over a relatively high-speed link to the packet switched data network 31. The Internet access server 27 provides a compatible interface to the respective PCs (e.g., analog modem, ISDN or LAN) and protocol conversion and interfacing, as necessary, for two-way data communication over the particular high speed link to the packet data Internet.

For example, the server 27 may comprise a modem bank coupled to the public switched telephone network (not shown) and coupled through a high speed link to an IP router within the network 31. In such an implementation, the PCs 21 and 29 would have analog modems for dial-up communications with the server 27. For communications with the PCs 21, 29, the access server 27 would provide a point to point protocol (PPP) appearance.

As another example, the Internet access server 27 might communicate over a 10baseT Ethernet LAN with the PCs 21 and 29. In this example, the PCs 21, 29 would include Ethernet LAN type interface cards and would connect through appropriate wiring to the Internet access server 27. The server 27 would provide two-way protocol conversions, as necessary for IP communications over the network 31 and would connect via a high speed link to an IP router within the network 31. In such an implementation, the server 27 might also provide firewall functions, to control outside access to the LAN and to control access from the PCs 21, 29 on the LAN to the public network 31.

The various PCs include processors, memories, various disc drives, etc. Each of the PCs also includes a display or monitor, a keyboard, and possibly one or more additional user input devices (not shown) such as a mouse, joystick or track ball. Typically, the software running on the PCs includes an operating system, such as Windows '95, and a series of compatible applications programs running under the operating system. The software preferably implements a graphical user interface, including a user interface for communications through the public packet data network 31.

Many of the PCs also have voice communication capabilities. For example, PC 21 includes a microphone 23 and one or more speakers 25. These PCs also include analog to digital and digital to analog converters, and the CPUs in such PCs run software for compression and decompression of digitized audio (typically voice) information. The software also processes the audio information for transmission and reception of the compressed digital information in IP packets and using the appropriate protocol, for communication with the respective access server.

PCs having voice communication capabilities can conduct two-way, real-time audio communications with each other, in a manner directly analogous to a two-way telephone conversation. However, the actual signals exchanged between two such terminal devices go through the public packet data network 31 and the appropriate access servers 27. Typically, such communications at least bypass long distance interexchange carriers. If both PCs connect to the Internet via a LAN or other data network, the audio communications may not utilize the telephone network at all.

In accord with one feature of the invention, those PCs which have voice communication capabilities may also send and receive telephone calls via the wireless gateway system 5 with wireless handsets 1. Services between the PCs and the wireless handsets are discussed in more detail later.

The public packet data network 31 also connects to a number of PSTN gateways in different service areas both local and distant from the wireless gateway system 5. For convenience of illustration, only one such gateway 45 appears in FIG. 1. Each PSTN gateway 45 connects to one or more central offices 47 of the public switched telephone network in the region where the gateway 45 is located. Calls through the network to and from such gateways typically bypass long distance interexchange carriers and may utilize a data network connection to a PC at one end of the call, as in the earlier example. The PCs having voice communication capabilities may send and receive telephone calls via the public packet switched data network 31, one of the gateways 45 and the public switched telephone network (PSTN), to persons using standard telephones 49. The PSTN gateway(s) 45 also permit calls between wireless handsets 1 and telephone station(s) 49. Specifically, persons using the handsets 1 may call to or receive calls from persons using standard telephones 49 via the public packet data network 31 and one of the gateways 45.

Each PSTN gateway 45 provides a voice telephone grade interface to the public packet data network 31, for a large number of calls, to and from telephone networks such as the PSTN and/or cellular or PCS type public mobile telephone networks. Such a gateway 45 will connect to at least one central office (CO) 47 of the PSTN. The gateway connection typically utilizes one or more primary rate interface (PRI) type integrated services digital network (ISDN) line groups or a combination of one or more T1 circuits and a Simplified Message Desk Interface (SMDI) type signaling circuit. The line circuits provide digital line interconnections of the gateway 45 to the central office 47. The D channel of the PRI or the SMDI link carries a variety signaling back and forth between the PSTN gateway 45 and the CO 47. For example, on an incoming call from the CO 47 to the gateway 45, the signaling includes the calling party number and preferably the dialed destination digits.

The PSTN gateway 45 includes one or more computers for processing individual calls. The computers include appropriate line interfaces for answering incoming calls and initiating outgoing calls over the particular type of line circuits. The interfaces also receive and decode standard signaling messages from the PSTN, e.g. DTMF dialing signals and/or D channel ISDN signaling. The interfaces also detect line status and call progress signals on incoming and outgoing calls, either as in-band tone signals or as D channel messages.

Each of the computers in the PSTN gateway 45 runs software to compress incoming audio signals from the PSTN in one or more standardized formats and decompress digital audio signals in the format(s) received via the public packet data network 31, for transmission over the PSTN. As discussed more below, one of the compression formats or protocols is a standardized wireless telephone communication protocol used by the handsets 1. The computer(s) also perform the two-way protocol processing to send and receive compressed, digitized voice data in TCP/IP packet form over the network 31. The PSTN gateway 45 includes or connects to a router coupled to the public packet data network 31. Copending commonly assigned application Ser. No. 08/634,543 filed Apr. 18, 1996 now U.S. Pat. No. 6,438,218 describes several implementations of 'Internet Modules' which may serve as alternate embodiments of the PSTN gateway 45.

The devices communicating voice information over the public packet switched data network 31, such as the voice capable PC 21 and the PSTN gateway 45, may use any number of different voice compression protocols at other times. However, during communication with the wireless gateway system 5 such devices preferably utilize a standard compression protocol utilized by digital implementations of the handsets 1. The preferred coding technique, known as code excited linear predictive (CELP) coding may operate at rates such as 8.5 kbits/s. An alternative speech coding technique is vector-sum excited linear predictive (VSELP) coding.

In the preferred implementation, the handsets 1 include chip sets forming a digital coder and decoder (CODEC) conforming to the CELP protocol. As discussed in more detail below, frames of CELP encoded information are framed in Internet Protocol (IP) packets and communicated over the public packet data network 31. A central server may be used to translate between CELP and other protocols, but preferably the other devices (e.g., PC 21 or gateway 45) communicating with the handsets 1 can process CELP information in a manner similar to the operations performed by the CELP CODEC in the handsets, at least during communications with such handsets.

Some devices will in fact run a number of different voice compression/decompression protocols to facilitate communication with a wide range of devices over the packet data network 31. For example, the PSTN gateway 45 will process CELP encoded information and will operate in accord with several other common compression protocols. Part of the initial signaling to set up voice communication through the public packet switched data network 31 involves and exchange of signaling between devices to select a compatible compression protocol. For example, signaling between the PSTN gateway 45 and the wireless gateway system 5 would identify the CELP protocol, and the gateway would subsequently process voice communications with the gateway system 5 using CELP.

If the various CELP CODECs and CELP processing software operates at 8.5 kbits/s, and the CELP is wrapped in TCP/IP packets for transport via network 31, it is possible to transport at least six CELP encoded voice communications through one 64 kbits/s D0 type channel. As such, IP transport of CELP encoded audio achieves at least a 6:1 increase in transport capacity over the ADPCM (adaptive differential pulse code modulation) digital encoding now commonly used in telephone networks. For example, a T1 carries 24 D0s, therefore a T1 connection to an Internet router could carry 144 simultaneous CELP encoded conversations.

Communications via the public packet data network 31, such as the Internet, utilize IP protocol addressing. It may be helpful in understanding later discussed call processing examples to take a moment here to review the fundamentals of IP addressing. Each IP address comprises a series of four numbers separated by dots. An example of an IP address would be 164.109.211.237. Each machine on the Internet has a unique number permanently or temporarily assigned to it which constitutes one of these four numbers. In the IP address, the leftmost number has the greatest weight. By analogy this would correspond to the ZIP code in a mailing address. At times the first two numbers constitute this portion of the address indicating a network or a locale. That network is connected to the last router in the transport path. In differentiating between two computers in the same destination network only the last number field changes. In such an example the next number field 211 identifies the destination router.

When a packet bearing a destination address leaves a source router, the router examines the first two numbers in a matrix table to determine how many hops are the minimum to get to the destination. It then sends the packet to the next router as determined from that table, and the procedure is repeated. Each router has a database table that finds the information automatically. This continues until the packet arrives at the destination computer. The separate packets that constitute a message may not travel the same path depending on traffic load. However, they all reach the same destination and are assembled in their original order in a connectionless fashion. This is in contrast to connection oriented routing modes, such as frame relay and asynchronous transfer mode (ATM) or voice.

It would be difficult for most people to remember the four separate numbers (sometimes having ten or more digits) comprising each numeric IP address. In addition numeric IP addresses occasionally change or some systems temporarily assign IP addresses to active devices, making it even more of a problem for people to keep track of them. To facilitate person to person communications, however, people can address each other using easier to remember names. In the presently preferred embodiments, these names may be textual domain names or telephone number based domain names, but other name formats are within the scope of the invention. A domain name server system 51 translates the names into actual IP addresses.

An example of a textual Domain Name is Evoit@HUT.MB.COM. Each of the names separated by a dot is called a domain. The significance of each of the domains is the reverse of that of the numeric IP address. In the numeric IP address, the most significant numbers were on the left and the least significant on the right. The textual Domain Name System begins with the least significant on the left and proceeds to the most significant on the right. An example of a telephone number based Domain Name is '301–608–2908@phone'.

The top-level domains, those of the most general significance, are as follows:

1. COM A commercial operation
2. EDU A university, college or other educational institution
3. GOV A government organization
4. MIL A military site
5. ORG Any organization that does not fit into any of the preceding
6. NET A network There are now two-letter domains, each denoting a different country, which are atop the above original domain names. An address ending in "COM.AU," for example, would be a commercial operation in Australia. Over a hundred different countries are now connected to the Internet so the list of two-letter country codes is long and getting longer. Computers or servers associated with the Internet convert textual domain names into numeric IP addresses.

In the example illustrated, the domain name server 51 translates domain names into numeric IP addresses in response to requests from calling terminals. FIG. 1 depicts a single domain name server 51, and the discussion herein concentrates on a single server implementation for ease of explanation. In an actual, large scale deployment, the domain name server system would comprise a number of server systems 51 in a hierarchical arrangement. Each domain name server 51 would serve a region or segment of the public packet data network 31 and would provide translations and conditional analysis processing of names corresponding to addresses residing within the segment served. Any computer or PC on the segment requesting translation would first query the domain name server system 51 serving that segment. If the domain name was not one associated with the server, the domain name server 51 would communicate through the hierarchy of such servers to relay the query to the appropriate server for processing; and after processing, that server would provide the destination address and any associated information in the reply back to the querying device. Also, each domain name server 51 in a given area could be duplicated, for redundancy.

As'shown in simplified form in FIG. 1, the domain name server (DNS) 51 comprises a server computer which functions as the central processing unit of the domain name server. The computer has an IP packet data interface to the network 31. The DNS system 51 also includes a data storage system storing a series of databases attached to or incorporated into the server. The databases include look-up tables for direct translations of names to addresses and may include routing control records for conditional processing of requests for communication with at least some customers.

Essentially, when a person wishes to initiate a communication, they instruct their PC 21 or 29 to start communication using a name address, either based on a textual name or a telephone number. The PC transmits a name translation request or 'query' to the domain name server system 51 via the appropriate access server 27 and the network 31. The server 51 receives the domain name query from the public packet data network 31. In response, the server 51 may execute a direct look-up table based translation to an IP address and/or an associated telephone number, for example for voice communication. Also, for any called party customer who has established a more sophisticated routing service, the server 51 will execute conditional analysis in response to the domain name translation query, as disclosed in commonly assigned application Ser. No. 08/812,075 filed Mar. 6, 1997 entitled "ENHANCED INTERNET DOMAIN NAME SERVER" now U.S. Pat. No. 6,104,711, the disclosure of which is incorporated herein entirely by reference. The domain name server 51 responds in the same way to translation queries from other nodes on the packet data network, such as the PSTN gateway(s) 45 and the wireless gateway system(s) 5.

One form of conditional analysis by the domain name server 51 involves checking a home location register (HLR) to determine which of several possible locations to route a call to in order to reach the called customer. In accord with one aspect of the present invention, the wireless gateway 5 will update home location register information, for example stored in or accessible through the domain name server system 51, for persons using the wireless handsets 1. In the embodiment illustrated in the drawing, the HLR information is maintained in a separate database 33 coupled to the public packet data network 31.

When a person inputs a telephone number or a domain name to initiate an outgoing call from one of the handsets 1, that is intended for routing through the public packet switched data network 31, the wireless gateway system 5 formulates and transmits the query through the network 31 to the domain name server 51. The server 51 returns the appropriate address information to the wireless gateway system 5, and the system 5 utilizes that information to establish the call through the network 31 to the destination, e.g. to the PC 31 or to a telephone 49.

When another person calls a subscriber, the person enters an address or a telephone number associated with the subscriber. The caller's PC 21 or a PSTN gateway 45 serving the caller formulates and transmits the query through the network 31 to the domain name server 51. The server 51 returns the appropriate address information to establish the call through the public packet data network 31 and the wireless gateway system 5. As discussed more below, in a highly automated call processing embodiment, the domain name server 51 delivers the address information at least in part through an interaction with the HLR database 33.

The wireless gateway system 5 of the present invention has a number of different applications. For example, in a business application for a single factory or office location, one system 5 shown in solid line form in FIG. 1 might provide internal telephone communications and connections for local and long distance telephone service. However, the roaming capability for service to the handsets 1 would be limited to the area in and around the factory or office location covered by the wireless communication range of the service through antennas 3. The system 5 would control handshaking, registration and validation procedures to limit service to only the handsets authorized by the owner of the system 5, e.g. to limit usage to employees.

Another application relates to a more public wireless access in some relatively public installation, such as an airport, shopping center, hotel/convention center complex or the like. In such a case, the operator of one gateway system 5 (solid lines) would supply temporary users with handsets 1 compatible with the particular system 5. The system 5 would control handshaking, registration and validation procedures and might limit service to only the handsets supplied by the system operator.

Alternatively, the wireless gateway system 5 might allow access using handsets other than those corresponding to the particular system 5, either in a business situation where the private operator has similar systems (one of which appears in phantom in FIG. 1) installed at other company locations or in a situation where the public wireless access provider allows handsets from other systems (shown in phantom lines) to access the gateway system 5. In any such application, the wireless gateway system 5 must verify authorization in some manner.

In an automatic verification mode, the system 5 communicates with a home location register (HLR) associated with the handset 1 to verify authorization. The wireless gateway system 5 also obtains customer profile information from the HLR and stores that data in a visitor location register (VLR) assigned to the handset. In the preferred embodiment, a central database 33 accessible via the public packet switched data network 31 maintains the HLR records. The HLR database 33 provides verification and billing information to the wireless gateway system 5. The HLR database 33 also records the identity of the system 5 currently registering the handset 1, to facilitate routing subsequent calls to that handset. The HLR database 33 may be implemented in software in the domain name server computer, in a server similar to the domain name server 51 or in any other system accessible via the network 31. Alternatively, a server on the network 31, such as server 51, may access some other system that maintains the HLR for the particular handset 1. For example, the server might access HLR data in an Integrated Service Control Point of a public telephone network.

Specific examples of calls to and from the wireless gateway system 5 as well as the registration processing by the system 5 and the domain name server system 51 will be described in more detail later. Next, consider the structure of the wireless gateway system 5 in somewhat more detail.

Figure 2:
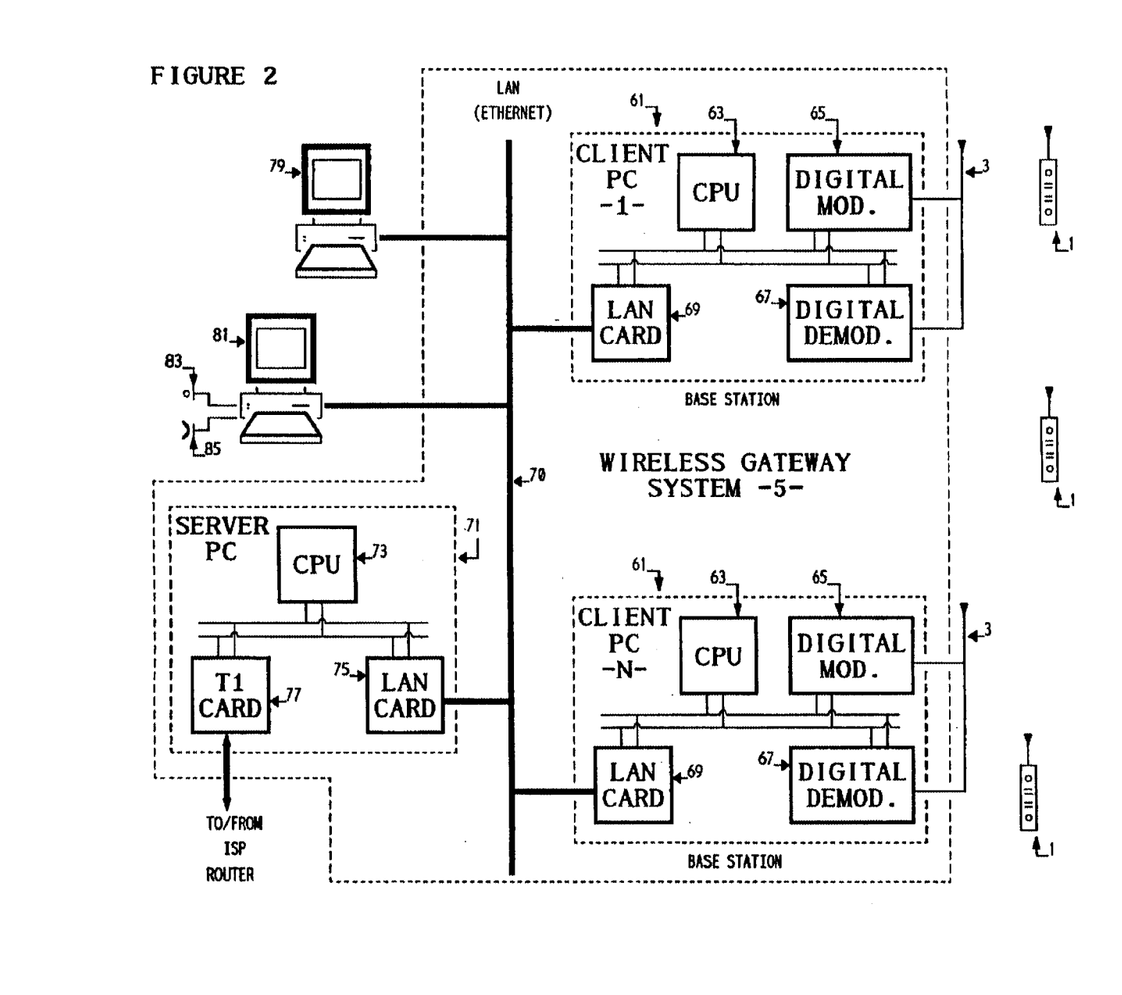
FIG. 2 is a functional block diagram of a preferred embodiment of the inventive wireless gateway system.

As shown in FIG. 2, the preferred implementation of the wireless gateway system 5 includes a server 71 and one or more base stations 61. The server 71 is built around a high end personal computer (PC) or the like, whereas each of the base stations 61 is built around a lower powered client processor, typically a low-end personal computer (PC). The server PC 71 and the client PCs 61 that function as the base stations all connect to some form of local area network (LAN) 70. One function of the server PC 71 is to provide the gateway system 5 with a public network interface. Specifically, the server PC 71 interfaces the digital communications on the LAN 70 to packet switched communication via the public packet switched data network 31. The client PCs 61 provide an interface between the digital communications on the LAN 70 and a standardized air (wireless) interface used by wireless terminal devices such as the handsets 1.

Each client PC 61 serving as a base station of the wireless gateway system 5 includes a CPU 63, a digital modulator 65, a digital demodulator 67 and a LAN interface card 69. The elements of the client PC 61 communicate via an internal PC bus structure and appropriate bus protocol. The CPU 63 includes a microprocessor and a variety of standard memory devices. The client PC may include other PC hardware components, such as disc drives for software storage and user interface components. The LAN interface card 69 provides a two-way data interface compatible with the particular LAN 70, for example a 10baseT Ethernet LAN.

The LAN card transmits and receives addressable messages over the LAN 70 for communication with other devices on the LAN. The addressing conforms to the media access control (MAC) functionality of the particular LAN protocol.

The digital modulator 65 and the digital modulator 67 operate on one or more frequencies assigned for wireless telephone communications. The digital modulator and demodulator 65, 67 also use a standardized multiplexing and/or multiple access technique, such as north american TDMA (Time Division Multiple Access), CDMA (Code Division Multiple Access), GSM (Global System for Mobile) or the like, so as to provide a number of operative channels over the wireless air interface. In an implementation covering a large area and serving a large number of mobile customers, the base stations may have sufficient intelligence to provide hand-off between areas of coverage or 'cells' in a manner analogous to existing cellular telephone service. In a relatively small installation, the base stations 61 would provide a more limited service without hand-off, in a manner more analogous to public cordless telephone systems designed to serve a plurality of terminal devices.

The server 71 comprises a PC or similar computer with interfaces to the LAN 70 and the particular data link used to couple the wireless gateway system 5 to the public packet data network 31. Typically, the server PC 71 includes a CPU 73, a LAN interface card 75 and a card 77 providing an interface to a link connected to and from a router operated by an Internet Service Provider (ISP)

In the illustrated example, the LAN 70 is a 10baseT Ethernet LAN, therefore server PC 71 includes a 10baseT Ethernet type LAN card 75 which transmits and receives addressable messages over the LAN 70 for communication with other devices on the LAN. Also, in the illustrated embodiment, the wireless gateway system 5 connects to a router of an ISP via a T1 circuit, therefore the server PC 71 includes a T1 card 77. If the system utilizes a different connection to the ISP, for example a token ring or SONET link, the server PC would include an appropriate interface card in place of the T1 card 77.

The elements of the server PC 71 communicate via an internal PC bus structure and appropriate bus protocol. The CPU 73 includes a microprocessor and a variety of standard memory devices. The server PC may include other PC hardware components, such as disc drives for software storage and user interface components.

The LAN 70 may use any appropriate local data communication network technology. For example, the network may be fiber or wire. The network 70 may be a local ATM (Asynchronous Transfer Mode) network or a token ring, etc. In some implementations, the LAN may in fact be a segment of the Internet itself carrying TCP/IP traffic to and from various base stations. In the illustrated preferred embodiment, the LAN 70 is a 10baseT Ethernet LAN. The size and protocol of the LAN 70 and the number of base stations used depends on the area serviced by the wireless gateway system 5 and the projected traffic loads on the system 5.

The LAN 70 also carries normal data communications between PCs such as 79 and 81 and any other data devices coupled to the LAN. Preferably, another function of the server PC 71 is to provide firewall and gateway functions for data communications to and from PCs 71 and 81 via the public packet data network 31. At least some of the data terminals are voice capable PCs essentially similar to the PC 21. By way of example, FIG. 2 shows one such voice capable PC 81 having a microphone 83 and one or more loudspeakers 85. The LAN carries voice communication to and from the local voice capable PCs 81. In this manner, the gateway system 5 can provide local telephone services analogous to those offered by a PBX. For example, the system 5 can carry two-way CELP encoded audio information between two voice capable PCs 81 over the LAN 70. Also, the gateway system 5 facilitates two-way audio communication between any voice capable local PC 81 and any of the handsets 1 currently registered with and operational through the particular wireless gateway system 5. The voice capable local PCs 81 can also utilize the LAN 70 and the server PC 71 to conduct two-way audio communications over the Internet, e.g. with a voice capable PC 21 or with a standard telephone 49 through a PSTN gateway 45.

As a result, the wireless gateway system 5 shown in FIG. 2 provides an integrated solution to the communication needs of a business, including inter-office voice telephone service between desk-tops and to and from mobile users, data services, as well as data and voice communication services over the, public packet data network 31. The wireless gateway system 5 utilizes a dedicated data link (e.g. a T1) to an Internet Service Provider (ISP), not a dial-up connection through the local PSTN. As such, the connection to the ISP bypasses the local exchange telephone carrier, and the packet data network bypasses any interexchange carrier on long distance calls.

In the preferred implementation, the server PC 71 performs the IP packet processing (at least for communications with the base stations 61). For example, on incoming audio communications, the server PC 71 reorders data from the IP packets to compensate for any packets received out of sequence due to varied packet routing through the public packet data network 31. The server PC transmits the information, in correct sequence, over the LAN 70 to the appropriate device, such as a client PC 61. The performance of the IP processing in the server PC 71 reduces the processing load on the client PC 61 and the overhead requirements on the LAN 70. In alternate implementation, the IP packets could go through to and come directly from the PC serving as the base station, and that PC would perform the IP packet processing on incoming and outgoing information. Depending on the implementation, this may eliminate the need for the server PC, in which case the client PCs would also handle the various registration, HLR and VLR functions. In such a case, the client PCs might connect directly to a TCP/IP traffic segment of the Internet, and the wireless gateway system 5 may comprise one or more such base stations connected directly to the Internet.

Within the gateway system 5, all of the communicating devices connect to the LAN 70, in the illustrated example an Ethernet LAN. The LAN protocol provides for addressing of messages exchanged between devices coupled to the LAN. For example, on an Ethernet LAN, messages carry media access control (MAC) information in a packet header. The MAC information identifies the destination device.

For example, when the server PC 71 sends CELP data for a call to a predetermined base station PC 61, the server PC 71 inserts the MAC address of the client PC 61 serving as that base station and transmits the message over the Ethernet LAN 70. The LAN card 69 in the client PC 61 recognizes its MAC address and accepts the message for further processing. In this example, the packet includes additional data identifying the particular call as well as the CELP payload data. The CPU 63 of the client PC 61 reformats the data if necessary to conform to the particular air interface and addresses a message containing the CELP data for the particular handset 1 and supplies the message over the internal bus to the digital modulator 65. The digital modulator modulates the message into a channel (frequency and TDMA or CDMA slot) assigned to the handset and broadcasts the modulated message over the wireless link via the associated antenna 3.

In the opposite direction, the digital demodulator 67 demodulates a message, such as a CELP frame, from the channel assigned to the particular handset, and supplies that message over the internal bus to the CPU 63. The CPU reformats the message if necessary and supplies the message to the LAN card 69 with an instruction to send the message to the server PC 71. The LAN card inserts the MAC address for the server PC 71, formats the message as an Ethernet packet and transmits the message on LAN 70. The LAN card 75 in the server PC 71 recognizes its MAC address and accepts the message for further processing. In this example, the packet again includes additional data identifying the particular call as well as the CELP payload data. The CPU 73 formats the payload data with appropriate addressing information for TCP/IP packet transmission and supplies the packet(s) over the internal bus to the T1 card 77. The card 77 frames the TCP/IP packet(s) for transmission over T1 and transmits the packets(s) to the router an Internet Service Provider (ISP).

Communications between PCs 79 and 81, communications between client PC base stations 61 and communications between the base stations 61 and voice capable PC(s) 81 all utilize similar addressing over the LAN 70.

Consider now the registration and call processing operations of the wireless gateway system of the present invention.

As noted above, some applications of the wireless gateway system 5 will allow access only to handsets associated with the one localized system 5. In such a case, the server PC 71 maintains the data tables necessary for authentication of the handsets 1. For purposes of discussion of detailed operational examples, however, assume that the operational methodology permits roaming service through two or more of the systems 5, and each system 5 performs an automatic verification of handsets 1 through interaction with an HLR database 33.

The database 33 maintains subscriber data files, which substantially correspond to the "Home Location Register" data commonly used in cellular systems to validate service requests for each mobile telephone. For actual communication, a number of wireless gateway systems 5 treat each subscriber's handset 1 as a roamer. Such systems 5 may operate, for example, in a company's offices and/or factories at separate geographic locations. The server PC 71 in each gateway system 5 maintains "Visitor Location Register" (VLR) type information for each handset 1 registered as active in the area(s) served by the particular wireless gateway system 5. The VLR data, for example, includes downloaded subscriber profile data, and in a multi-zone system 5, the VLR stores data identifying at least the zone and possibly the base station through which the handset last registered.

In an active standby mode of operation, the circuitry in each handset 1 monitors signals broadcast from the cell site antennas 3 indicating the registration zone in which the handset 1 currently is located. A zone may include several cells served by individual base stations, but in the preferred implementation the zones correspond to individual cells served by the base stations. When the handset circuitry determines that the handset 1 has just entered a new zone or that the handset 1 has just been turned on, the circuitry initiates a handset registration procedure. The handset 1 transmits a radio message, requesting registration and identifying the handset 1, over a signaling channel to the base station 61 which services the particular zone or cell. The base station 61 in turn forwards the registration request message, via the LAN 70, to the server PC 71.

The server PC 71 checks its Visitor Location Register (VLR) files to determine if the identified handset 1 has previously registered with the particular gateway system 5. For example, if the handset 1 has registered with the system 5 but for a different registration zone, the Visitor Location Register (VLR) for that handset is simply updated to show the new zone in which the handset 1 is operating.

If the handset 1 has not registered with the particular wireless gateway system 5, the server PC 71 transmits a signaling message requesting validation to the HLR database 33 through the public packet data network 31. The database 33 responds much the same way that a home mobile telephone switching office having a normal cellular subscriber's home location register responds, by providing validation and service profile information regarding the particular wireless handset 1. The server or other system maintaining the HLR database 33 transmits TCP/IP packets containing the validation and service profile information back through the public packet switched data network 31 to the server PC 71. The server PC 71 stores the service profile information in a visitor location register (VLR) which it assigns to the particular handset 1, and then the server PC 71 sends an acknowledgment message via the LAN 70 to the client PC 61 serving as the base station for the newly registered handset 1. The message informs the base station that the handset is now registered, and the base station may send an acknowledgement message to the handset. The server PC 71 uses the stored profile information to control services on subsequent calls to and from the handset 1 and to bill for the services.

At this time, the database 33 updates the location registration data portion of the subscriber's home location register with identification data for the server PC 71 and the wireless gateway system 5, to indicate the current point at which the handset 1 is registered. The HLR database 33 may also send a de-registration message to the last known wireless gateway system 5 previously in contact with the wireless handset 1.

During actual operation of the wireless gateway system 5, there will often be a variety of data communications carried over the LAN 70, one or more voice communications to and from one or more PCs 81 and a number of wireless calls in progress. The wireless calls will include calls to other wireless handsets 1, calls to voice capable PCs 81 and incoming and outgoing calls via the public packet switched data network 31. Consider now several individual call processing examples.

When a subscriber wishes to make a call, the subscriber enters the digits for the destination number (or characters of a domain name) and activates a transmit function whereby the handset 1 sends the dialed digits to a client PC 61 which constitutes the nearest base station. The client PC 61 forwards the digits and the identification of the handset 1 through the LAN 70 to the server PC 71 as a service request. The server PC 71 checks its data files to determine if the calling handset 1 is registered, and if not registered, then the server PC initiates a registration procedure of the type discussed above.

When the calling handset 1 is registered, the server PC 71 checks the service profile stored in the visitor location register assigned to the handset to determine if the caller is entitled to make the particular call. For example, the server PC 71 might determine whether the call is a local call, a long distance call or an international call and whether or not the particular customer has subscribed to the corresponding class of service. If the data stored in the visitor location register indicates that the requested call should go through, the server PC 71 instructs the client PC 61 to allocate an available radio channel to the calling handset 1.

If the call is directed to another handset 1 currently registered as active on the same wireless gateway system 5, the system 5 will connect the call between the two handsets through the LAN 70 and one or more of the client PC base stations 61. Specifically, the server PC 71 allocates a channel through base station transceiver 61 to the called handset 1 and instructs the respective client PCs make the connection via the LAN between the channels assigned to the called and calling parties handsets. The wireless gateway system 5 also will complete calls via the LAN 70 to an identified voice capable data terminal, such as PC 81.

A key feature of the present invention relates to routing of outgoing and incoming calls via the wireless gateway system 5 over the public packet switched data network 31. Consider first some examples of outgoing calls. Assume for a first example that the authorized outgoing call from a wireless handset 1 is intended for a user at PC 21, which has voice communication capabilities. In such a case, after the authorization processing by the server PC 71 discussed above, the server PC initiates signaling through the network 31 to establish communication with the called PC 21.

More specifically, the server PC 71 utilizes the dialed destination digits to initiate communication via the public packet switched data network 31. The packet server PC 71 transmits a translation request or 'query' to an appropriate server. The server may be an Internet telephone service registration server. In the preferred embodiment, the domain name server system 51 performs the telephone number (or domain name) to IP address translations, therefore the server PC 71 transmits the translation query to the domain name server system 51 via the public packet switched data network 31.

The server 51 receives the query from the public packet data network 31. If a called party customer has established a more sophisticated routing service, the server 51 may execute a conditional analysis in response to the domain name translation query, as discussed in detail in the above cited application Ser. No. 08/812,075 filed Mar. 6, 1997 now U.S. Pat. No. 6,104,711. However, for this discussion assume that the called party using PC 21 does not have such a service, in which case, the server 51 executes a direct look-up table based translation to an IP address for the PC 21. If the PC 21 does not have a permanently assigned address, the server 51 may obtain a temporary address for the terminal from a Dynamic Host Configuration Protocol or 'DHCP' server (not shown).

Having obtained the IP address of the destination terminal, the address of the PC 21 in the present example, the server system 51 formulates a response message containing the IP address in one or more TCP/IP packets and transmits the message back through the public packet data network 31 to the server PC 71. The server PC 71 uses the received IP address to transmit a signaling message through the public data network 31 and the appropriate access server 27 to the PC 21 indicating a call to that destination terminal.

The message may include information regarding the call, such as the telephone number or an identification number associated with the calling party's handset 1. If on and available to receive calls, the PC 21 provides appropriate audible and/or visual notice of the call to the called user. Any call notification display would include the information relating to the calling handset 1, if such information is included in the signaling message. The PC 21 sends back a status message through the network 31 to the server PC 71 indicating that it is notifying the called party, and the server PC 71 relays the message to the client PC 61. At this time, the client PC 61 formulates a series of packets containing CELP data simulating a telephone ring-back tone and transmits those packets over the allocated RF channel to the handset 1. The handset 1 decompresses the CELP data representing the ring-back tone and produces an audible ring-back output through the speaker of the handset. The calling party hears ringing.

If the called user activates the PC 21 to accept the incoming call, the PC 21 transmits a signaling message back through the public packet data network 31 notifying the server PC 71. The server PC 71 in turn instructs the client PC 61 to stop transmission of the ring-back tone to the calling party's handset 1. At this time, the PCs 61 and 71 begin passing two-way CELP information between the handset 1 and the PC 21 via the LAN 70 and the public switched packet data network 31.

Specifically, the client PC 61 encapsulates the outgoing CELP information received from the handset 1 in Ethernet packets and sends the packets over the LAN 70 to the server PC 71. The server PC 71 in turn strips off the Ethernet framing information, packetizes the CELP information in IP packet, frames the packets for transport over T1 and sends the packets over the T1 to the network 31.

The IP packets bear the address of the PC 21, therefore the network 31 supplies the packets through the access server 27 to the PC 21. The software in the PC 21 strips off any physical layer protocol information, organizes the IP packets in sequential order and removes the CELP information from the IP packets. Additional software in the PC 21 decompresses the CELP data, and in response to the decompressed information, the analog interface card of the PC 21 provides analog audio signals to drive the speaker 25. The user at PC 21 hears the speech or other audio from the caller at handset 1 as output by the speaker 25.

In the other direction, the PC 21 converts audio input signals from microphone 23 into digital information and compresses the digital data, using the CELP compression algorithm. The PC 21 packetizes the CELP information in IP packets and transmits the IP packets through the access server 27 and the network 31 to the wireless gateway system 5. In the system 5, the server PC 71 strips off the T1 framing, organizes the IP packets in sequential order and removes the CELP information from the IP packets. The server PC 71 encapsulates the incoming CELP information in Ethernet packets and sends fit the packets over the LAN 70 to the client server 61. The client server 61 in turn strips off the Ethernet framing information and transmits the CELP information in the appropriate air interface format via the modulator 65 and the antenna 3 to the handset 1. The CODEC circuitry in the handset 1 decompresses the CELP data and converts the data to analog audio signals to drive the speaker of the handset. The user at the handset 1 hears the speech or other audio from the user at PC 21.

Consider now a call from the handset 1 to a normal telephone 49 via the packet switched data network 31. Again the user dials a telephone number using handset 1, and the handset 1 sends a signaling message containing the number to the system 5. The wireless gateway system 5 internally verifies authenticity, and the server PC 71 transmits a translation query to an appropriate server, preferably the domain name server system 51, as in the earlier example.

The domain name server system 51 performs the telephone number to IP address translations, in this case to identify the IP address of a PSTN gateway 45 providing an interface to the local telephone network in the area encompassing the called station 49.

The domain name server system 51 formulates a response message containing the IP address in one or more TCP/IP packets and transmits the message back through the public packet data network 31 to the server PC 71. The server PC 71 uses the received IP address to conduct a signaling communication through the public packet data network 31 with the PSTN gateway 45. As part of the signaling communication, the server PC 71 identifies CELP as the voice compression protocol.

The server PC 71 also supplies the dialed telephone number to the PSTN gateway 45. The PSTN gateway 45 initiates a voice telephone call to the telephone 49 through one or more COs 47 of the local public switched telephone network serving that gateway 45. If the line to telephone station 49 is busy, the CO(s) 47 return a busy signal through tone or D channel signaling. The PSTN gateway 45 detects this busy signal and transmits an appropriate status message back through the packet data network 31 to the server PC indicating the busy condition. In response to the busy status message, the server PC 71 transmits a message through the LAN 70 to the client PC 61 instructing the client PC 61 to provide busy tone to the calling party's handset 1. At this time, the client PC 61 formulates a series of packets containing CELP data simulating a telephone busy signal and transmits those packets over the allocated RF channel to the handset 1. The handset 1 decompresses the CELP data representing the busy tone signal and produces an audible busy signal output through the speaker of the handset. The calling party hears busy tone.

If instead the called station 49 is available, the serving end office 47 applies a ringing signal to the line to that station and sends a ring-back tone or D channel ring-back message to the PSTN gateway 45. The PSTN gateway 45 detects this ring-back signal and transmits an appropriate message back through the packet data network 31 to the server PC 71. In response to the 'available' (ring-back) status message, the server PC 71 transmits a message through the LAN 70 to the client PC 61 instructing the client PC 61 to provide ring-back tone to the calling party's handset 1. At this time, the client PC 61 formulates a series of packets containing CELP data simulating a telephone network type ring-back tone signal and transmits those packets over the allocated RF channel to the handset 1. The handset 1 decompresses the CELP data representing the ring-back tone signal and produces an audible ringing signal output through the speaker of the handset. The calling party hears the tone signal signifying ringing of the called station 49.

When someone answers the call at telephone station 49, for example by taking the handset off-hook, the serving central office (CO) 47 detects this condition as a 'ring-trip'. In response, the central office removes the ringing signal from the called line, and the same or a different office serving the PSTN gateway 45 removes the ring-back signal from the line connected to the PSTN gateway 45. The local telephone network including the office(s) 47 provide a voice communication link between the PSTN gateway 45 and the line to the off-hook telephone 49.

The PSTN gateway 45 senses the off-hook condition, either by signaling from its serving end central office 47 or by detection of the end of the ring-back tone. Upon so detecting an answer by the party at station 49, the PSTN gateway 45 transmits another status message through the packet data network 31 to the server PC 71 indicating the answer condition. In response to the 'answer' status message, the server PC 71 transmits an instruction through the LAN 70 to the client PC 61 instructing the PC 61 to remove the simulated ring-back tone and establish two-way audio communications.

Both the PSTN gateway 45 and the wireless gateway system 5 begin two-way voice frequency signal processing and associated two-way transmission of TCP/IP packets containing CELP format compressed voice frequency information. In this regard, the communications between the handset 1 and the PSTN gateway 45 are similar to those between the handset and the PC 21 discussed earlier. However, in this example, the PSTN gateway sends and receives the audio signals via the telephone network instead of providing the local analog audio interface via the speaker and microphone. The user at handset 1 can talk to the answering party at telephone station 49, in a normal conversational manner.

In the above described application with HLR verification, the domain name server system will perform a conditional analysis, to access the HLR location information, on incoming calls directed to users of the handsets 1. Consider now an example of a call from the PC 21.

When a person wishes to initiate a communication, they instruct their PC to start communication using a name or telephone number based address. The PC transmits a translation request or 'query' to the domain name server system 51 via the appropriate access server 27 and the public packet data network 31. The server 51 receives the domain name query from the public packet data network 31. In response, the server may execute a direct look-up table based translation to an IP address or telephone number. However, for any called party customer who has established a more sophisticated routing service, the server 51 will execute conditional analysis in response to the domain name translation query.

In its simplest form, if the conditional analysis produces a first result, the server 51 translates a textual or telephone number based name included in the query into a first destination IP address. If the conditional analysis produces a second result, the server 51 translates the name included in the query into a second destination IP address. The server then transmits a response message containing the first or the second destination address to a calling PC. The PC uses the received IP address to establish the desired communication through the public packet data network 31.

In the present example, the simplest translation might result in call routing to another voice capable PC (not shown) or to the telephone station 49. Alternatively, the called party's routing control record stored in the domain name server system 51 will result in accessing that party's home location register (HLR) in the database 33. The location information in the HLR always identifies a current registration location for the called party. The location may be that of a landline telephone 47 or a PC similar to PC 21.

However, for the present example, assume that the registered location identifies the wireless gateway system 5. The HLR database 33 accesses its stored data tables to determine the IP address of the particular wireless gateway system 5 with which the called party's handset 1 is currently registered. The database 33 could send a routing request message to the identified system 5 asking for any additional information that might be needed to route the call, such as whether or not the handset is still active and/or any specialized routing data needed to complete a call through the system 5 to the handset 1. However, in the presently preferred embodiment, the translation itself provides the IP address of the system 5 (and the telephone number or other identifier of the specific handset 1 if different from the number used to initiate the call).

The database 33 transmits the address of the server PC 71 for the system 5 and any associated identification information relating to the handset 1 as a response message, contained in one or more TCP/IP packets, back through the public packet data network 31, in this case to the calling PC 21. The PC 21 uses the IP address to transmit a signaling message through the public packet data network 31 to the server PC 71. The message identifies the calling party at least by the IP address of the PC 21. The message also identifies the called party's handset 1 and indicates an incoming call to that particular handset. The server PC 71 accesses the VLR assigned to the called handset 1 and thereby identifies the base station client PC 61 currently serving that handset.

The server PC 71 reformats the incoming call message and sends that message over the LAN 70 to the identified client PC 61. In response, the client PC 61 transmits an RF paging message to the handset 1 indicating an incoming call and requesting an answer from the identified handset 1. The handset 1 transmits a response to the page back to the client PC 61, and the handset 1 generates a ringing signal. The handset may also display any available calling party identification information from the signaling message. While the handset 1 is ringing, the client PC 61 provides an appropriate status message over the LAN to the server PC 71, and the server PC 71 relays that message through the network 31 to the calling PC 21. The calling PC 21 provides visible and/or audible notice of ringing back to the user at that end.

When the called party answers, the handset 1 and the client PC 61 execute an appropriate handshake and commence two-way voice channel transmission via an allocated RF channel (e.g. using an assigned digital time slot or using assigned CDMA codes). In response to the handshake, the client PC 61 provides an appropriate status message over the LAN to the server PC 71, and the server PC 71 relays that message through the network 31 to the calling device, in this case to the PC 21. This message informs the PC 21 of the answer condition. In response to the answer status message, the PC 21 commences its two-way voice processing and communication of compressed voice data (in CELP format) via the public packet switched data network 31. The server PC 71 and the client PC 61 provide a two-way interface for this communication from the connection to the public packet data network 31 to the handset 1. The handset and the PC conduct two-way audio communications via the system 5 and the network 31 in essentially the manner described for the earlier example of communication between those two devices. The user at handset 1 can talk to the calling party at PC 21, in a normal conversational manner.

Consider now a call from a person using a normal telephone, such as telephone station 49. The calling party dials a telephone number assigned to the called party, and the central offices 47 of the public switched telephone network route the call to the PSTN gateway 45. The gateway 45 receives the dialed number in a signaling message from the central office 47. (Alternatively, the caller could dial a number assigned to the PSTN gateway 45 and then input the called party number in response to a tone or prompt from that gateway.) The call set-up process typically will also provide the calling party's telephone number to the PSTN gateway 45.

The PSTN gateway 45 transmits a translation query to an appropriate server, preferably the domain name server system 51. The server 51 receives the domain name query from the public packet data network 31. As in the example of a call from the PC 21 to the handset 1, the domain name server executes a conditional analysis process which in this example results in accessing the called party's home location register (HLR) in the database 33. The location information in the HLR always identifies a current registration location for the called party. The location may be that of a landline telephone 47 or a PC similar to PC 21, but for the present example, assume again that the registered location identifies the wireless gateway system 5. The HLR database 33 accesses its stored data tables to determine the system 5 with which the called party's handset 1 is currently registered and provides the necessary address and any other identification or routing information to the PSTN gateway 45, in essentially the same manner as in the example of the call from the PC 21.

The PSTN gateway 45 uses the IP address to transmit a signaling message through the public packet data network 31 to the server PC 71. The message preferably includes at least the caller's telephone number as calling party identification information. The message identifies the called party's handset 1 and indicates an incoming call to that particular handset. The server PC 71 accesses the VLR assigned to the called handset 1 and thereby identifies the base station client PC 61 currently serving that handset.

The server PC 71 reformats the incoming call message and sends that message over the LAN 70 to the identified client PC 61. In response, the client PC 61 transmits an RF paging message to the handset 1 indicating an incoming call and requesting an answer from the identified handset 1. The handset 1 transmits a response to the page back to the client PC 61, and the handset 1 generates a ringing signal. The handset may also display any available calling party identification information from the signaling message. While the handset 1 is ringing, the client PC 61 provides an appropriate status message over the LAN to the server PC 71, and the server PC 71 relays that message through the network 31 to the PSTN gateway 45. At this time, the PSTN gateway 45 transmits a tone signal simulating a telephone ring-back tone through the central office(s) 47 to the calling party's telephone 49, so that the calling party hears ringing.

When the called party answers, the handset 1 and the client PC 61 execute an appropriate handshake and commence two-way voice channel transmission via an allocated RF channel (e.g. using an assigned digital time slot or using assigned CDMA codes). In response to the handshake, the client PC 61 provides an appropriate status message over the LAN to the server PC 71, and the server PC 71 reformats and relays that message through the network 31 to the calling packet data device, which in this case is the PSTN gateway 45. This status message informs the PSTN gateway 45 of the answer condition.

In response to the 'answer' status message, the PSTN gateway 45 removes the simulated ring-back tone. The PSTN gateway 45 begins two-way voice frequency signal processing and associated two-way transmission of TCP/IP packets containing compressed voice frequency information via the public packet data network 31. At the same time, the server PC 71 and the client PC 61 provide a two-way interface for this communication from the connection to the public packet data network 31 to the handset 1. The handset 1 communicates CELP encoded information with the PSTN gateway 45 through the system 5 and the network 31 in essentially the manner described for the earlier examples, and the gateway 45 provides the audio interface to the telephone 49 through the PSTN. The user at handset 1 can talk to the calling party at telephone station 49, in a normal conversational manner.

The registration of the handsets with the base station and server PCs in the wireless gateway system 5 in combination with the maintenance of location registration information in the HLR database 33 facilitate roaming from one wireless gateway system to another. As the user roams, the handset periodically registers with one of the gateway systems 5, and each system 5 performing a registration provides a location update notice to the HLR database as part of the verification operation. In response to each query for translation relating to the called subscriber's handset 1, the conditional analysis processing by the domain name server system 51 and the retrieval of location registration information through the HLR database 33 result in routing of each call through the public switched packet data network 31 to the user's current location.

As noted above, the preferred implementation of the wireless gateway system 5 also provides communications over the LAN 70 for PCs 79 and 81. The PCs 79 and 81 can communicate data with each other and access the public packet data network 31 for data communications via the server PC 71. In this regard server PC 71 also performs appropriate firewall and gateway functions, for security. The voice capable PCs 81 can make calls to and receive calls from other such PCs as well as the wireless handsets 1 currently serviced by the particular gateway system 5. The server PC 71 also provides PCs 81 access to the public packet data network 31 for making and receiving voice calls. Call processing methodologies similar to those discussed above also apply to voice calls to and from any one of the voice capable PCs 81 served by the particular wireless gateway system 5.

The present invention admits of a wide range of modifications, within the scope of the appended claims. For example, each base station may connect directly to the internet. The computer serving as the base station would handle all IP processing and registration functions of the client PC and the server PC.

While the foregoing has described what are considered to be preferred embodiments of the invention, it is understood that various modifications may be made therein and that the invention may be implemented in various forms and embodiments, and that it may be applied in numerous applications, only some of which have been described herein. It is intended by the following claims to claim all such modifications and variations which fall within the true scope of the invention.

We claim:

1. A localized wireless gateway system, comprising:
    a plurality of base station transceivers for providing two-way wireless voice frequency communication signals in a standard compressed digital data format to and from wireless telephone terminals within a local area, each of said base station transceivers comprising a client computer;
    a local area data network directly coupled to each of the client computers; and
    a server computer including an interface to the local area data network and an interface to a public packet data network, for processing the standard compressed digital data format signals for two-way packet communication thereof via the public packet data network and for signaling through the public packet data network to establish two-way voice communication sessions for the wireless telephone terminals through the public packet data network.

2. A system as in claim 1, wherein each of the base station transceivers further comprises:
    a digital modulator coupled to an antenna;
    a digital demodulator coupled to the antenna; and
    an interface coupling the client computer to the local area data network.

3. A system as in claim 1, wherein the two-way packet communication conforms to the Internet Protocol (IP).

4. A system as in claim 3, wherein the local area data network carries communication signals confirming to a protocol selected from the group consisting of Internet Protocol (IP), Ethernet, and Asynchronous Transfer Mode (ATM).

5. A system as in claim 3, wherein the standard compressed digital data format comprises a wireless telephone communication protocol for digitized and compressed voice communication.

6. A system as in claim 5, wherein the wireless telephone communication protocol comprises code excited linear predictive (CELP) coding or vector-sum excited linear predictive (VSELP) coding.

7. A telecommunication system comprising:
    a system of interlinked data networks using TCP/IP protocol;
    a plurality of terminal devices coupled for data communication via the system of interlinked networks, at least one of the terminal devices having two-way audio communication capabilities; and
    a localized wireless gateway system, comprising:
        a plurality of base station transceivers for providing two-way wireless voice frequency communication signals in a standard compressed digital data format to and from wireless telephone terminals within a local area, each of said base station transceivers comprising (a) a client computer including a central processing unit, (b) a digital modulator and a digital demodulator controlled by the central processing unit for wireless communication of audio signals in the standard compressed digital data format over a predetermined air interface with the wireless telephone terminals, and (c) a local area data network interface to a data network for connection to a server,
        a local area data network directly interconnecting the local network interfaces of the base station transceivers for carrying data packets in a predefined packet data protocol, and
    a public network interface comprising a server computer including an interface to the local area data network and an interface to the system of interlinked data networks, for processing the audio signals in the standard compressed digital data format for two-way packet communication thereof via the system of interlinked data networks and for signaling through the system of interlinked data networks to establish two-way voice communication sessions through the system of interlinked data networks.

8. A telecommunication system as in claim 7, further comprising a home location register database coupled for two-way signaling communication via the system of interlinked data networks.

9. A telecommunication system comprising:
    a system of interlinked data networks using TCP/IP protocol;
    a plurality of terminal devices coupled for data communication via the system of interlinked networks, at least one of the terminal devices having two-way audio communication capabilities;

a domain name server coupled for two-way signaling communication via the system of interlinked data networks; and a plurality of base station transceivers for providing two-way wireless voice frequency communication signals in a standard compressed digital data format to and from wireless telephone terminals within a local area, each of said base station transceivers comprising (a) a client computer including a central processing unit, (b) a digital modulator and a digital demodulator controlled by the central processing unit for wireless communication of audio signals in the standard compressed digital data format over a predetermined air interface with the wireless telephone terminals, and (c) a local area data network interface to a data network for connection to a server, a local area data network directly interconnecting the local network interfaces of the base station transceivers for carrying data packets in a predefined packet data protocol, and a public network interface at said server coupled between the local area data network and the system of interlinked data networks.

10. A telecommunication system as in claim 7, further comprising a telephone network gateway, operationally connected between the system of interlinked data networks and a public telephone network, for providing voice telephone communications to and from telephones coupled to the public telephone network.

11. A telecommunication system as in claim 7, wherein the system of interlinked data networks comprises the Internet.

12. A telecommunication system as in claim 7, wherein the local data network carries communication signals conforming to a protocol selected from the group consisting of Internet Protocol (IP), Ethernet, and Asynchronous Transfer Mode (ATM).

13. A telecommunication system as in claim 7, wherein the standard compressed digital data format comprises a wireless telephone communication protocol for digitized and compressed voice communication.

14. A telecommunication system as in claim 13, wherein the wireless telephone communication protocol comprises code excited linear predictive (CELP) coding or vector-sum excited linear predictive (VSELP) coding.

15. A system as in claim 1, wherein a wireless terminal of said plurality of wireless terminals initiates a telephone call to a destination terminal, said destination terminal receiving said telephone call as an incoming call.

16. A system as in claim 15, wherein an internet access server is connected to said public packet data network and said destination terminal is connected to said internet access server.

17. A system as in claim 16, wherein said destination terminal is a computer.

18. A system as in claim 16, wherein said server computer initiates said signaling through said public packet data network.

19. A system as in claim 16, wherein destination characters are entered into said wireless terminal, said destination characters being a destination number or domain name, said destination number or said domain name identifying said destination terminal.

20. A system as in claim 19, wherein said server computer initiates signaling to establish communication with said destination terminal, said server computer using said destination characters to initiate said signaling.

21. A system as in claim 20, wherein an internet telephone service registration server is connected to said public packet data network.

22. A system as in claim 20, wherein said internet telephone service registration server receives said destination characters, obtains the destination terminal address of said destination terminal, and transmits said destination terminal address to said server computer.

23. A system as in claim 22, wherein said server computer uses said destination terminal address to transmit a first signaling message to said destination terminal, said destination terminal receiving said first signaling message.

24. A system as in claim 23, wherein upon receipt of said first signaling message, said destination terminal generates a notification and transmits a status message, said notification notifying a called party, said status message indicating that said destination terminal is notifying said called party.

25. A system as in claim 24, wherein said server computer transmits said status message to a base station transceiver of said plurality of base station transceivers, said base station transceiver transmitting a ring-back signal to said wireless telephone terminal, said ring-back signal being transmitted as a standard compressed digital data format signal.

26. A system as in claim 25, wherein said destination terminal transmits a second signaling message when said called party activates said destination terminal, said destination terminal being activated to accept said incoming call, said second signaling message being received by said server computer.

27. A system as in claim 26, wherein upon receipt of said second signaling message, said server computer instructs said base station transceiver to end transmission of said ring-back signal.

* * * * *